Jan. 10, 1950
H. ANDREWS
2,494,079
THERMOSTATIC CONTROL DEVICE
Filed Jan. 26, 1948
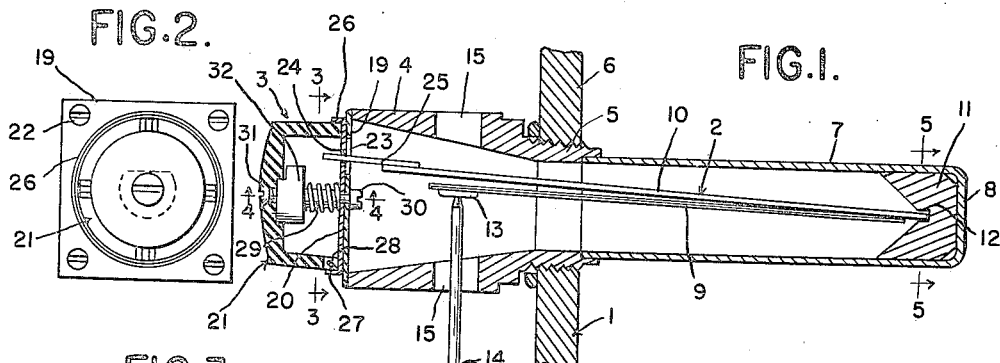
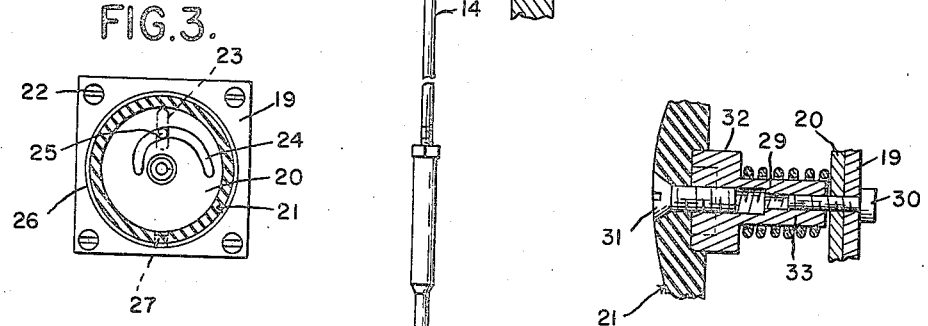
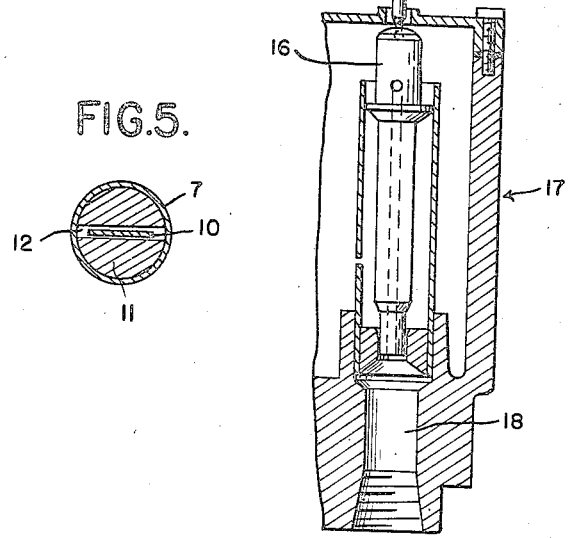
*INVENTOR.*
HENRY ANDREWS
BY
ATTORNEYS Patented Jan. 10, 1950

2,494,079

UNITED STATES PATENT OFFICE 2,494,079

THERMOSTATIC CONTROL DEVICE

Henry Andrews, Lansing, Mich., assignor to Platt Products Corporation, Lansing, Mich., a corporation of Michigan Application January 26, 1948, Serial No. 4,355

5 Claims. (Cl. 236—101)

The invention relates to thermostatic control devices and it refers more particularly to thermostatic control devices having adjustable thermally responsive members for controlling the operation of another device.

The invention has for one of its objects to provide an improved construction of thermostatic control device which is efficient in operation and comprises parts which may be economically manufactured and assembled.

The invention has for another object to provide an improved construction of thermostatic control device in which the thermally responsive member may be readily adjusted by a rotatable member.

The invention has for a further object to provide an improved device for adjusting the thermally responsive member.

With these and other objects in view, the invention resides in the novel features of construction and combinations and arrangements of parts as more fully hereinafter set forth.

In the drawings:

Figure 1 is a sectional view of a thermostatic control device embodying the invention;

Figure 2 is an end view thereof;

Figures 3, 4 and 5 are cross sections on the lines 3—3, 4—4 and 5—5 respectively of Figure 1.

As illustrated in the present instance, the thermostatic control is designed for use with a water heater and controls the flow of liquid fuel to a burner for heating the water in a tank. The thermostatic control comprises the support 1, the thermally responsive unit 2 carried by the support and the adjusting device 3 for adjusting the thermally responsive unit.

The support 1 is formed of the hollow body 4 having at its inner end the reduced threaded portion 5 engaging the wall 6 of the water tank. The support also comprises the tube 7 sleeved in and secured to the inner end of the threaded portion 5 of the body and having the closed inner end 8 which is remote from the body 4.

The thermally responsive unit 2 is formed of the thermally responsive member 9 and the adjusting member 10. The thermally responsive member 9 is a bi-metal bar extending longitudinally of and beneath the adjusting member 10 which is a bar. These bars are secured together preferably by spotwelding the inner end of the bi-metal bar to the adjusting bar near its inner end. The thermally responsive unit extends generally longitudinally within the body 4 and tube 7 which together form a housing for the unit. The thermally responsive unit is mounted at its inner end on the mounting 11 which is a plug within the tube 7 at its inner end. This plug is formed with the transverse groove 12 which receives the inner end of the adjusting bar 10 and provides sufficient clearance for relative angular movement of the thermally responsive unit. The outer end of the bi-metal bar has secured to its lower surface, preferably by solder, the snap fastener 13 which receives a ball-shaped upper end of the operating rod 14 extending through one of the transverse holes 15 in the body 4. This operating rod is formed of an upper and lower section adjustably threadedly engaging each other and has a ball-shaped lower end which is received by the upper end of the valve 16 of the float control device 17, the valve being vertically movable by the bi-metal bar to control the flow of the liquid fuel, which is oil, through the outlet 18 of the float control to the burner.

The device 3 for adjusting the thermally responsive unit comprises the backplate 19, the cam plate 20 beside the backplate and the manually operable knob 21 for rotating the cam plate. The backplate is secured at its corners to the outer end of the body 4 by suitable means such as the screws 22 and has the vertical elongated rectilinear opening 23 above its center. The cam plate frictionally engages the outer side of the backplate and has the cam-shaped spiral opening 24 which crosses the opening 23 of the backplate. These two openings cooperate to form in effect an orifice which receives the outer end of the thermally responsive unit which in the present instance is formed of the finger 25 in the nature of a wire secured to the adjusting bar and extending longitudinally thereof beyond its outer end. The cam plate has the peripheral flange 26 encircling the inner end portion of the knob 21 except for the tongue 27 extending into the notch 28 in the inner end of the knob. This tongue and notch structure provides for rotating the cam plate upon rotation of the knob to thereby vertically adjust the outer end of the thermally responsive unit. The knob 21 is rotatably mounted on the backplate 19 by a construction comprising the shaft 29, the bolt 30 and the screw 31. The shaft has the head 32 extending into a recess in the inner side of the top wall of the knob, both the head and recess having a flat side to hold the shaft and knob from relative rotation.

The bolt 30 extends through central holes in both the backplate and cam plate and the reduced portion 33 of the shaft while the screw 31 extends through the top wall of the knob and is threaded into the head of the shaft. 34 is a coil spring encircling the reduced portion 33 of the shaft and abutting the head 32 of the shaft and also the cam plate 20 for resiliently holding the cam plate in frictional engagement with the backplate.

With the above construction, it will be readily seen that the body 4 and the tube 7 form a housing unit which may be readily threaded into the wall of a water tank; also, that the thermally responsive and adjusting members form a unit which may be readily inserted within the housing unit and mounted at its inner end on the mounting plug which can be readily assembled in place. Further, the backplate, cam plate, manually operable knob and associated securing parts can be readily assembled to form a unit which can be easily secured in place and to the outer end of the body 4 of the support. It will also be seen that the thermally responsive unit can be readily adjusted to control its operation and in the present instance thereby control the flow of the liquid fuel or oil.

What I claim as my invention is:

1. A thermostatic control device comprising a bi-metal bar, a fastener at one end of said bi-metal bar for engaging an operating rod, an adjusting bar secured to said bi-metal bar at the end of the latter remote from said fastener, a fulcrum mounting for said bars engaging the end of said adjusting bar adjacent the secured end of said bi-metal bar, a backplate having an elongated rectilinear opening and a cam plate beside said backplate and having a cam-shaped opening crossing said rectilinear opening, a finger on the end of said adjusting bar remote from said fulcrum mounting and extending into said openings and a rotatable knob mounted on said backplate and connected to said cam plate to rotate said cam plate relative to said backplate, and a hollow support housing said bi-metal bar, adjusting bar and fulcrum mounting and carrying said backplate, cam plate and knob.

2. A thermostatic control device comprising a hollow body, a tube secured to and having a closed end remote from said hollow body, a grooved mounting within said tube at the closed end thereof, a bi-metal bar and an adjusting bar secured together and forming a unit within said hollow body and tube and engaging the groove of said mounting, a backplate secured to the end of said hollow body remote from said tube and having an elongated rectilinear opening, a cam plate beside and mounted on said backplate and having a cam-shaped opening crossing said rectilinear opening, a finger on said adjusting bar extending into said openings, a rotatable knob mounted on said backplate and connected to said cam plate to rotate the latter and resilient means for holding said cam plate frictionally against said backplate.

3. A thermostatic control device comprising a housing, a mounting within said housing, a thermally responsive member and an adjusting member secured together and forming a unit within said housing engaging said mounting, a backplate on said housing having an elongated opening, a cam plate beside said backplate and having a cam-shaped opening crossing said elongated opening, means on said adjusting member extending into said openings for moving said adjusting member upon relative rotation of said backplate and cam plate and a rotatable knob on said backplate and connected to said cam plate to rotate the latter.

4. A thermostatic control device comprising a support, a thermally responsive member and an adjusting bar secured together and forming a unit and mounted at one end on said support, and means for adjusting the other end of said unit including a plate secured to said support and a rotatable member, said plate and rotatable member respectively having an elongated opening and a cam surface for guiding and moving the last mentioned end of said unit upon rotation of said rotatable member.

5. A thermostatic control device comprising a body, a tube secured to said body, a plug within said tube remote from said body, an adjusting bar within said body and tube having an end mounted on said plug, a thermally responsive member mounted on said adjusting bar and cooperating relatively movable plates on said body for moving the end of said adjusting bar remote from said plug to thereby adjust the device.

HENRY ANDREWS.

REFERENCES CITED

The following references are of record in the file of this patent:

UNITED STATES PATENTS

| Number | Name | Date |
|---|---|---|
| 1,669,707 | Haynes | May 15, 1928 |
| 1,870,253 | Johnson | Aug. 9, 1932 |
| 1,968,194 | Finley | July 31, 1934 |